US008822910B2

(12) United States Patent
Wang et al.

(10) Patent No.: US 8,822,910 B2
(45) Date of Patent: Sep. 2, 2014

(54) METHOD FOR COLLABORATIVE TUNING OF GAMMA CAMERA

(75) Inventors: Sharon Xiaorong Wang, Hoffman Estates, IL (US); James Frank Caruba, Bartlett, IL (US); John Thomas Pawlak, Villa Park, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 814 days.

(21) Appl. No.: 12/560,055

(22) Filed: Sep. 15, 2009

(65) Prior Publication Data

US 2010/0148046 A1 Jun. 17, 2010

Related U.S. Application Data

(60) Provisional application No. 61/097,922, filed on Sep. 18, 2008.

(51) Int. Cl.
*G12B 13/00* (2006.01)
*G01T 1/164* (2006.01)
*G01T 1/00* (2006.01)
*G01T 7/00* (2006.01)

(52) U.S. Cl.
CPC . *G01T 1/00* (2013.01); *G12B 13/00* (2013.01); *G01T 1/1648* (2013.01); *G01T 7/005* (2013.01)
USPC ...................................... 250/252.1

(58) Field of Classification Search
CPC ...... G01T 7/005; G01T 1/1648; G01D 18/00; G12B 13/00
USPC ...................................... 250/252.1
See application file for complete search history.

(56) References Cited

U.S. PATENT DOCUMENTS

2011/0095172 A1* 4/2011 Malmin et al. ............. 250/252.1

* cited by examiner

*Primary Examiner* — David Porta
*Assistant Examiner* — Carolyn Igyarto
(74) *Attorney, Agent, or Firm* — Peter Kendall

(57) ABSTRACT

A system and tuning method to collaboratively calibrate high voltage DAC values and Photomultiplier Tube DAC values of photomultiplier tubes of a gamma camera so that the detector produces a valid energy spectrum over the entire detector surface. A method for tuning a gamma camera having a plurality of photosensors, exposes the photosensors to scintillation photons corresponding to nuclear radiation of known energy; measures an energy output corresponding to each specific photosensor; calculates an average enemy output of all photosensors in the camera; collaboratively adjusts a DAC value corresponding to a voltage applied to a specific photosensor and a $DAC_{HV}$ value corresponding to a high voltage applied to the camera based on the calculated average energy, energy output of each photosensor, and a target energy value corresponding to said known energy; and repeats the calibration until convergence is achieved between the average energy, energy output, and target energy.

8 Claims, 3 Drawing Sheets

Collaborative control Scheme

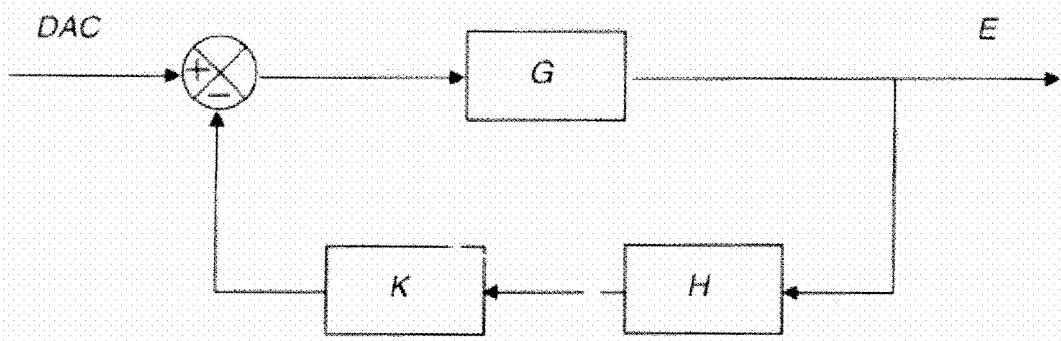
Figure 1. Control block diagram of tuning.
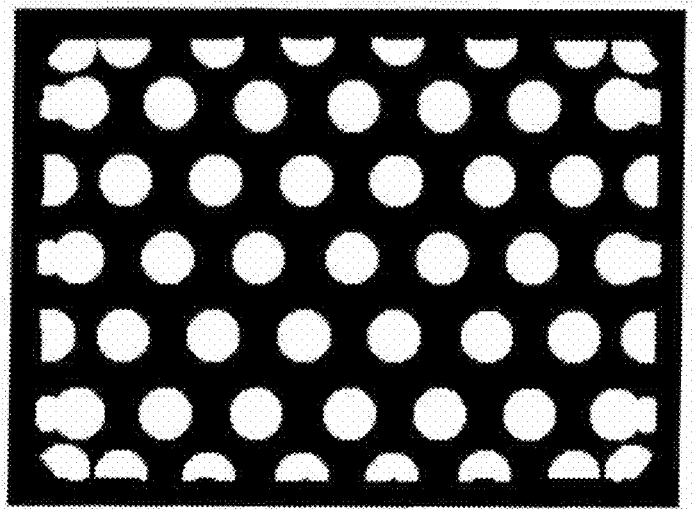
Figure 2. Mask of tuning.

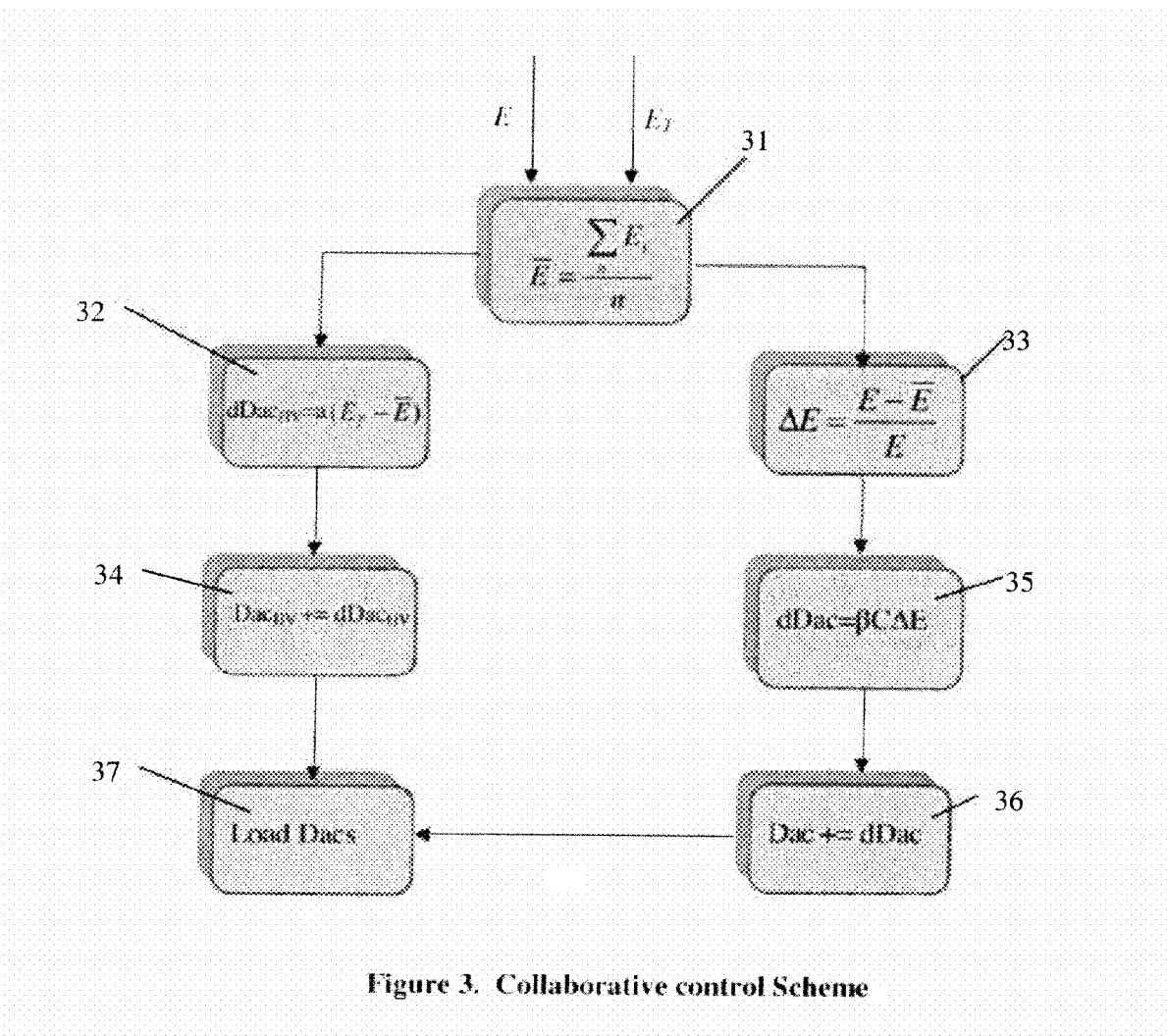
Figure 3. Collaborative control Scheme

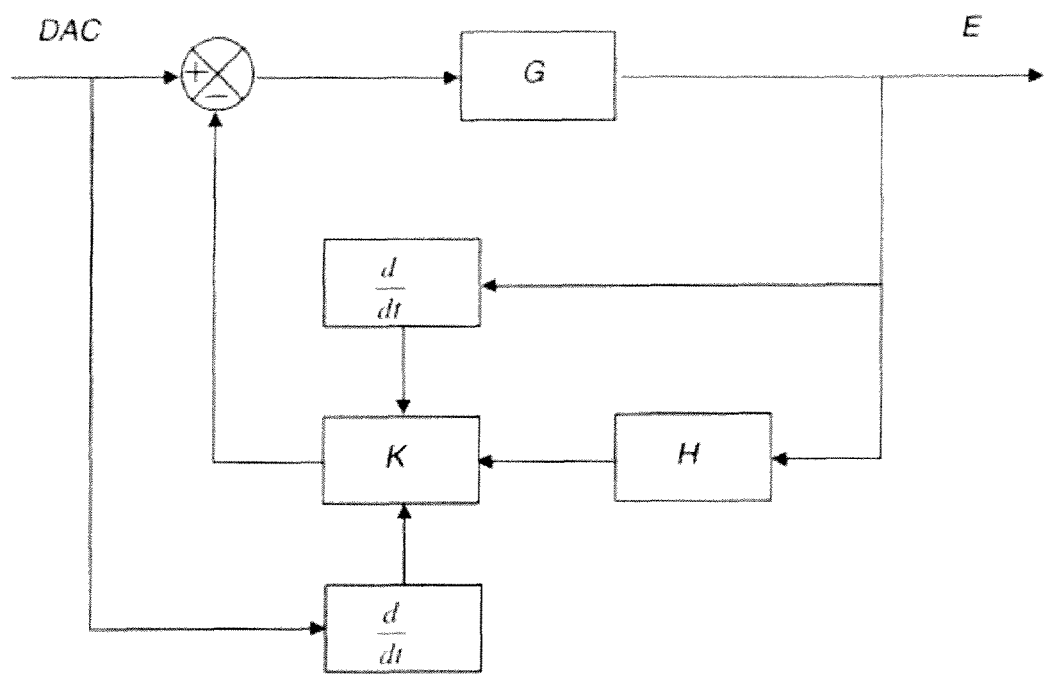
Figure 4. Time variant gain computation.

METHOD FOR COLLABORATIVE TUNING OF GAMMA CAMERA

FIELD

The present invention generally relates to nuclear medicine imaging and systems and methods for calibrating and tuning a gamma ray camera ("gamma camera").

DISCUSSION OF THE BACKGROUND

Gamma cameras are primarily used by physicians and medical practitioners who specialize in the field of nuclear medicine. Nuclear medicine is a unique medical specialty wherein low-level radioactive materials (called radionuclides or radiopharmaceuticals) are used to generate images of the organs, bones or tissues of the body. The images generated by gamma cameras are primarily used to determine whether organs or tissues are functioning properly.

Typically, the radionuclides or radiopharmaceuticals are introduced orally or intravenously into the body of a patient. Radiopharmaceuticals are specially formulated to collect temporarily in a specific part of the body to be studied, such as the patient's heart or brain. Once the radiopharmaceuticals reach the intended organ, they emit gamma rays that are then detected and measured by the gamma camera.

A typical gamma camera includes a large area scintillation crystal, which functions as a gamma ray detector. The crystal is typically sodium iodide doped with a trace of thallium (NaI(Tl)). The crystal converts high-energy photons (e.g., gamma rays) into visible light (i.e., lower energy photons). The crystal is positioned to receive a portion of the gamma ray emissions from the radiopharmaceutical in the body.

When a gamma ray strikes and is absorbed in the scintillation crystal, the energy of the gamma ray is converted into flashes of light (i.e., a large number of scintillation photons) that emanate from the point of the gamma ray's absorption in the scintillation crystal. A photo-multiplier tube (PMT), which is optically coupled to the scintillation crystal, detects a fraction of these scintillation photons and produces an output electronic signal (e.g., current or voltage pulse) having an amplitude that is proportional to the number of detected scintillation photons. The gamma ray camera typically has a plurality of photomultiplier tubes placed in a two dimensional array, with the signals from the different photomultiplier tubes being combined to provide an indication of the positions and energies of detected gamma rays.

The scintillation photons emitted from the detector crystal are typically in the visible light region of the electromagnetic spectrum. The scintillation photons spread out from the point of emission. A large fraction of the scintillation photons are transported from the point of emission to a light sensitive surface, called the photocathode, of the PMTs. A fraction of the scintillation photons incident on the photocathodes cause an electron to be emitted from the photocathode. The electron, also called a photoelectron, is then electrostatically accelerated into an electron-multiplying structure of the PMT, which causes an electrical signal to be developed at an output of the PMT. The amplitude of the electrical signal is proportional to the number of photoelectrons generated in the PMT during the time period that scintillation photons are being emitted. Thus, after a gamma ray absorption event, the PMT outputs an electrical signal that can be used with other signals from other PMTs to determine the location of the gamma ray absorption event.

The number of scintillation photons producing electrical signals in each PMT is inversely related to the distance of the PMT from the point of gamma ray absorption, or event location. It is because of this relationship that the position of the event can be calculated from the signals of the PMTs surrounding the event location.

Ideally, the signal derived from each PMT should have exactly the same proportional relationship to the distance from the event location as for all other PMTs. In addition to distance from the event location, the amplitudes of the signals derived from each PMT are proportional to two basic parameters: 1) the number of scintillation photons detected by a PMT, and 2) the gain or amplification of the PMT. Therefore, accuracy to which the position of the event location can be calculated depends on these two factors remaining constant over time.

Typically, a gamma camera is tuned or calibrated prior to its operation so as to ensure that the camera will calculate accurately the positions of event locations anywhere within an area called the field of view (FOV). Common commercial, large FOV gamma cameras have between about 50 and 100 PMTs. A tuning procedure will typically require a number of steps that balance or equalize the signal amplitudes of the PMTs. The gains of the PMTs are adjusted such that the total sum of the signals from all the PMTs is approximately the same in response to a given fixed energy gamma event, regardless of the location of the event in the FOV.

To tune a gamma camera according to known protocol, a known pattern or grid of a distributed radiation source is presented to the camera, usually by placing a mask over the camera crystal, so that calculated event locations can be calibrated to match the known locations fixed by the mask. The exact tuning and/or calibration steps may be different among cameras produced by different manufacturers. However, once the tuning and calibration steps are complete, the image quality, which depends on the camera's ability to accurately position event locations, depends on the transport of scintillation light to the PMTs and the gains of the PMTs remaining unchanged from the time when the tuning and calibration procedures were performed.

A number of factors can cause a change in either the gain of a PMT or the light collection properties of the camera. PMT gain is a strong function of temperature, counting rate (i.e., the number of incident gamma events per unit time), and the high voltage (HV) power supply regulation. Additionally, the gain of a PMT changes over time as it ages.

The light collection efficiency from the crystal to the photocathodes of the PMTs can change if the transmissive properties of lightguide surfaces change. For example, the PMTs are optically coupled to a glass or plastic lightpipe using either an optical grease or epoxy. If any of these materials' light transmissive properties change over time, then the transport of scintillation photons to the PMT will change. Additionally, NaI)Tl) is a hygroscopic material, and if water vapor reaches the crystal it yellows and the light transmission is diminished.

Different manufacturers have developed and implemented different means to maintain the constancy of PMT gains. These means typically fall into two categories: 1) automatic (i.e., not requiring the user to initiate the process), and 2) user quality control (QC) procedures (i.e., procedures initiated by the user). Generally, a combination of both automatic and QC procedures has been required.

One automatic system, for example, utilizes light-emitting diodes (LEDs) coupled into the photomultiplier tubes to provide a light signal for calibration of each individual tube. A constant fraction of the light emitted by the LED is incident on the light-sensitive photocathode of the PMT. The PMT output signal is checked against a reference that was set at the time of the last calibration. The gain of the PMT is adjusted if the measured signal has strayed from the reference.

This gain calibration technique depends on the light-emitting diodes having a constant light output for each pulse. Light-emitting diodes, however, do not have constant light output as it varies as a function of temperature, and may also vary over the lifetime of the diode. Another drawback of this technique of automatic calibration is that the light from the diode is mostly directly incident on the photocathode of the photomultiplier tube. Therefore, the transport of the light through the scintillation crystal, and associated optical elements, is not significantly sampled by the pulse of light from the diode.

User-initiated QC procedures usually require the placement of a radioactive source to uniformly illuminate the camera. The system acquires an appropriate number of events to achieve statistically significant sampling of each event location. A computer program then analyzes the measured energies and/or image of event locations to determine whether or not the system has drifted away from the properly calibrated state. Many variations of this procedure are possible, but all typically require the user to position a source of radioactivity and initiate the computer controlled acquisition and analysis. Additionally, the procedures also typically require the user to remove the collimator from the camera.

Such QC procedures are cumbersome to the user. If they can be initiated at the end of the day, and complete themselves automatically, then the user's time required is minimal. However, radioactive sources that must be left out in a room overnight require institutional procedures for securing the room, logging out the source and returning it in the morning, and prohibiting access to the room by cleaning and unauthorized personnel. Performing QC procedures during working hours reduces available patient imaging time on the system and increases costs because personnel cannot perform patient imaging while doing QC procedures.

There is a need for improvements upon prior systems and methods, including, e.g., the systems and methods described in the following patents, each of which is incorporated herein by reference in its entirety:
1. U.S. Pat. No. 7,071,474, entitled "Methods and Apparatus for Tuning Scintillation Detectors;"
2. U.S. Pat. No. 7,005,646, entitled "Stabilized Scintillation Detector for Radiation Spectroscopy and Method;"
3. U.S. Pat. No. 6,835,935, entitled "System and Method for Calibrating and Tuning a Gamma Camera;" and
4. U.S. Pub. No. 2008/0083870, entitled "Self-Adaptive Tuning of Gamma Camera."

In particular, U.S. Pat. No. 6,835,935, assigned to the same assignee herein, teaches a system and method that is designed to calibrate and tune a gamma camera with minimal or no human intervention. The '935 system and method provide a valuable feature for the user in that the user is assured of optimal performance of the camera without requiring laborious procedures and expenditures of time that might otherwise be devoted to patient imaging. With the '935 system and method, analysis of PMT output pulses and calibration can be totally automatic. First, in one embodiment, the user does not need to handle a radioactive source because such sources can be made an integral part of the camera. Second, the system computer can be programmed to monitor continuously the count rate and, thereby, determine when the system is being used and when the system is idle. When the system is idle (i.e., the count rate being approximately equal to the natural background plus the contribution of the radioactive sources), the system computer can automatically monitor and record individual PMT signals. When a sufficient number of data points have been stored for each PMT, the mean amplitude and variance of each tube's response to the events can be calculated. These calculated values may be compared to baseline values (e.g., values that were calculated at the time of the last tuning and calibration of the system, providing a database for comparison) and/or to calculated values associated with neighboring PMTs to determine whether and to what extent adjustments to the camera need to made. Further, the software may be programmed to analyze the results of the comparisons and automatically make the necessary PMT gain adjustments.

Although a number of methods of tuning gamma cameras are known, there continues to exist a need for improved systems and methods. For example, methods to tune gamma cameras in the clear DAC mode are still needed.

SUMMARY

This disclosure describes a system and tuning method to collaboratively calibrate high voltage DAC values and Photomultiplier Tube DAC values so that the detector produces a valid energy spectrum over the entire detector surface.

In accordance with one embodiment, the invention provides a method for tuning a gamma camera having a plurality of photosensors, including exposing the photosensors to scintillation photons corresponding to nuclear radiation of known energy; measuring an energy output corresponding to each specific photosensor; calculating an average energy output of all photosensors in the camera; collaboratively adjusting a DAC value corresponding to a voltage applied to a specific photosensor and a $DAC_{HV}$ value corresponding to a high voltage applied to the camera based on the calculated average energy, energy output of each photosensor, and a target energy value corresponding to said known energy; and repeating the calibration until convergence is achieved between the average energy, energy output, and target energy.

BRIEF DESCRIPTION OF THE DRAWINGS

The exemplary embodiments of the invention will now be described in greater detail with reference to the attached drawings, in which:

FIG. 1 illustrates a block diagram of a tuning control process in accordance with an embodiment of the invention;

FIG. 2 illustrates a tuning mask for the generation of a model spectrum and a centroid;

FIG. 3 illustrates a DAC and $DAC_{HV}$ collaborative control scheme in accordance with an embodiment of the invention; and FIG. 4 illustrates a block diagram of a tuning control process in accordance with another embodiment of the invention, taking into account a time-variant gain computation.

DETAILED DESCRIPTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Tuning is an operation that adjusts a set of Digital-to-Analog Converters (DACs) in a circuit to provide appropriate voltage to each PMT tube, so that for an applied isotope, the energy level (E) detected across the whole crystal surface is the same and at a desired level.

Tuning can be described as an automated control process. FIG. 1 illustrates a block diagram of one preferred embodiment, where the input is the DAC values and the output is the detected energy vector E. When a set of DAC values are determined, the corresponding E values are obtained by measuring events passing through a tuning mask as shown in FIG. 2, in which each circular area corresponds to a PMT. In this preferred embodiment the system gain G is determined by the detector, which is a multi-variable function with non-linear characteristics. In the feedback loop, H and K are the mathematical model of the system gain. Applied together they generate a difference vector ΔDAC. Here H is the first order gain while K is the compensator.

There are two types of DAC in this preferred embodiment. The first is called high voltage $DAC_{HV}$, consisting of four DACs. DACs 1 and 2 are for energy increase while DACs 3 and 4 are for energy decrease. DACs 1 and 3 are for coarse tuning, while DACs 2 and 4 for fine tuning. The high voltage DAC change affects the energy of all photomultiplier tubes. Denote $E_c$ as the centroid of energy for all tubes, then $$E_c = \frac{1}{n}\sum_n E_i \qquad (1)$$

where n is the total number of PMTs of the detector, and $E_i$ is the energy of PMT i. In a preferred embodiment, the relationship of the high voltage DAC change with the energy detected can be approximated by a linear function, if the change is small. Such linear functions for the four DACs can be written as:

$$DAC'_{HV}-DAC_{HV}=\alpha_i(E_c-E),\ (E_c-E)>0,\ i=1,2 \qquad (2)$$

$$DAC'_{HV}-DAC_{HV}=-\alpha_i(E_c-E),\ (E_c-E)<0,\ i=3,4 \qquad (3)$$

In Equations (2) and (3), E is the desired energy level for the isotope used for tuning, while $DAC_{HV}$ is the high voltage DAC value corresponding to E.

The second type of DAC is called PMT DAC. In one embodiment there are 59 of them and each one corresponds to a PMT. The change in a particular PMT DAC affects not only the energy of its own PMT, but also the surrounding tubes. In this embodiment the relationship between PMT DAC change (ΔDAC) and the change of energy ΔE can be described by the following:

$$\begin{vmatrix} \Delta DAC_1 \\ \Delta DAC_2 \\ \vdots \\ \vdots \\ \Delta DAC_{59} \end{vmatrix} = \begin{vmatrix} \beta_1 \\ \beta_2 \\ \vdots \\ \vdots \\ \beta_{59} \end{vmatrix} \begin{vmatrix} C_{1,1} & \cdots & C_{1,59} \\ & \ddots & \\ \vdots & \ddots & \vdots \\ & & \ddots \\ C_{59,1} & \cdots & C_{59,59} \end{vmatrix} \begin{vmatrix} \Delta E_1/E_1 \\ \Delta E_2/E_2 \\ \vdots \\ \vdots \\ \Delta E_{59}/E_{59} \end{vmatrix} \qquad (4)$$

In equation (4), $[C_{i,j}]$ is the inverse of convolution matrix that can be considered as the system Jacobian; the vector β acts as the system gains, which are set according to different tube parameters and isotopes. $\Delta E_i$ is defined as $$\Delta E_i=(E_1-E_2) \qquad (5)$$

and $$\Delta DAC_1=(DAC_1-DAC_2) \qquad (6)$$

where $DAC_{ci}$ represents a PMT DAC value that produces $E_c$,

FIG. 3 illustrates a flow diagram of how DAC and $DAC_{HV}$ collaborative control works according to a preferred embodiment of the invention. Given the input vector of measured energy E and target energy vector $E_T$, at step 31 the average energy $\bar{E}$ of all tubes is calculated. Then at step 32 the difference between the average energy $\bar{E}$ and the target energy $E_T$ is calculated and is converted to a corresponding change of high voltage DAC value $dDac_{HV}$ by the system coefficient a. At step 34, the new $DAC_{HV}$ value is obtained by adding the calculated change value $dDac_{HV}$ to the current $DAC_{HV}$ value. On the other hand, at step 33 the energy change ΔE is calculated. Applying the system convolution matrix C and damping factor β to ΔE at step 35, the change dDac needed in DAC can be calculated. At step 36, the new DAC value is obtained by adding the calculated change value dDac to the current DAC value. Loading the new DAC and $DAC_{HV}$ values to the detector at step 37, the energy E can be measured again to be compared with the target value $E_T$ and needed changes again calculated until the measured energy converges to the target energy.

Because of the non-linearity and time variant nature of the system, Equations (2)-(4) are valid only over a small range. An effective and simple means to accommodate such system variance is to modify the feedback compensator gain during the control process shown in FIG. 1. FIG. 4 shows a block diagram when differentiators $$\frac{d}{dt}$$

are applied to feedback the system measurement in accordance with another embodiment of the invention. Introducing differentiators improves system transit accuracy, and speeds up the convergence process of tuning. Applying this control scheme to the high voltage DAC is equivalent to taking the derivative of both sides of Equations (2) and (3), yielding:

$$DAC'_{HV}=\alpha_i \dot{E}_c,\ (E_c-E)>0,\ i=1,2 \qquad (7)$$

$$DAC'_{HV}=-\alpha_i \dot{E}_c,\ (E_c-E)>0,\ i=1,2 \qquad (8)$$

Considering the sign of E in Equations (7) and (8), $\alpha_i$ can be written in the following discrete form as $$\alpha_i = \frac{DAC_{HV_{j-1}} - DAC_{HV_{j-2}}}{(E_{C_{j-1}} - E_{C_{j-2}})}, \qquad (9)$$

$$DAC_{HV_{j-1}} - DAC_{HV_{j-2}} \neq 0\ E_{C_{j-1}} - E_{C_{j-2}} \neq 0$$

Applying this control scheme to PMT DAC gives $$\beta_i = -\frac{D\dot{A}C}{[C_{m,n}](\dot{E}/E)} \qquad (10)$$

Its discrete form can be written as $$\beta_i = -\frac{DAC_{i-2} - DAC_{i-1}}{[C_{m,n}](E_{i-2} - E_{i-1})/E_{i-2}}, \qquad (11)$$

$$DAC_{i-2} - DAC_{i-1} \neq 0 \text{ and } E_{i-2} - E_{i-1} \neq 0$$

It should be pointed out that in this preferred embodiment in the case of PMT DAC, Equation (10) is obtained empirically and cannot be derived by taking derivatives of Equation (4).

Embodiments of the invention having been thus described, it will be apparent to those skilled in the art that the same may be varied in many ways without departing from the spirit and scope of the invention. Any and all such modifications are intended to be covered within the scope of the following claims.

What is claimed is:

1. A method for tuning a gamma camera having a plurality of photosensors, a plurality of high voltage Digital-to-Analog converters ($DAC_{HV}$), and a plurality of photosensor Digital-to-Analog converters ($DAC_{DET}$) associated with each photosensor, comprising:
   a) exposing the photosensors to scintillation photons corresponding to nuclear radiation of known energy;
   b) measuring an energy output corresponding to each specific photosensor;
   c) calculating an average energy output of all photosensors in said camera;
   d) calculating a difference between the average energy output of all photosensors and a target energy output of all photosensors;
   e) converting the difference to a corresponding calculated high voltage Dac change value;
   f) calculating for said $DAC_{HV}$ converters a high voltage Dac value by adding the calculated high voltage Dac change value to a current high voltage Dac value;
   g) calculating an energy change between measured energy output of each photosensor and said average energy output;
   h) calculating, for each of said $DAC_{DET}$ converters, a change in photosensor Dac value based on said calculated energy change;
   i) determining photosensor Dac values for each of said $DAC_{DET}$ converters by adding said calculated change in photosensor Dac value to current photosensor Dac values; and
   j) repeating steps b-i until convergence is achieved between the average energy, measured energy output, and target energy output.

2. The method of claim 1, wherein the photosensors are photomultiplier tubes (PMTS).

3. The method of claim 1, wherein step e) further comprises calculating $dDac_{HV}=a(E_T-\bar{E})$,
   where $dDac_{HV}$ is a high voltage Dac change value,
   a is a system component,
   $E_T$ is the target energy, and
   $\bar{E}$ is the average energy.

4. The method of claim 3, wherein step f) further comprises assigning $Dac_{HV}+=dDac_{HV}$,
   where $Dac_{HV}+$ is an increase in high voltage Dac.

5. The method of claim 1, wherein step g further comprises calculating $\Delta E$ where $\Delta E=(E-\bar{E})/E$,
   where $\Delta E$ is a change in energy
   E is measured energy and
   $\bar{E}$ is the average energy.

6. The method of claim 5, wherein step h further comprises assigning $dDac=\beta C\Delta E$
   where dDacHV is a change in high voltage Dac
   $\beta$ is a damping factor
   C is a convolution matrix and
   $\Delta E$ is a change in energy.

7. The method of claim 6, wherein step i further comprises assigning Dac+=dDac,
   where Dac+ is an increase in Dac and
   dDac is a change in Dac.

8. The method of claim 1, wherein changes in DAC values are computed by applying time-variant factors of DAC values and measured energy values in a feedback loop.

* * * * *